(12) United States Patent
Kodali et al.

(10) Patent No.: US 8,682,283 B2
(45) Date of Patent: Mar. 25, 2014

(54) ADJUSTING CONNECTION STATES OF A MOBILE WIRELESS DEVICE

(71) Applicant: Apple Inc., Cupertino, CA (US)

(72) Inventors: Sree Ram Kodali, Cupertino, CA (US); Shivesh Makharia, Santa Clara, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/912,992

(22) Filed: Jun. 7, 2013

(65) Prior Publication Data

US 2013/0331057 A1 Dec. 12, 2013

Related U.S. Application Data

(60) Provisional application No. 61/657,772, filed on Jun. 9, 2012, provisional application No. 61/664,126, filed on Jun. 25, 2012.

(51) Int. Cl.
*H04M 11/04* (2006.01)
*H04W 24/00* (2009.01)

(52) U.S. Cl.
USPC .................. 455/404.1; 455/423; 455/450

(58) Field of Classification Search
None
See application file for complete search history.

(56) References Cited

U.S. PATENT DOCUMENTS

| | | | |
|---|---|---|---|
| 8,380,214 B2 | 2/2013 | Widegren et al. | |
| 8,416,678 B2 | 4/2013 | Yi et al. | |
| 8,554,199 B2 * | 10/2013 | Park | 455/423 |
| 2009/0170441 A1 | 7/2009 | Eckert et al. | |
| 2011/0007682 A1 | 1/2011 | Islam et al. | |
| 2011/0019532 A1 | 1/2011 | Jung et al. | |
| 2011/0070900 A1 | 3/2011 | Shi et al. | |
| 2013/0028069 A1 | 1/2013 | Pelletier et al. | |

FOREIGN PATENT DOCUMENTS

| | | |
|---|---|---|
| EP | 2117182 A1 | 11/2009 |
| WO | 2011060997 A1 | 5/2011 |
| WO | 2011139043 A2 | 11/2011 |

OTHER PUBLICATIONS

International Search Report and Written Opinion for PCT application No. PCT/US2013/044706 dated Jun. 7, 2013.

* cited by examiner

*Primary Examiner* — Erika A Washington

(74) *Attorney, Agent, or Firm* — Womble Carlyle Sandridge & Rice LLP

(57) ABSTRACT

Methods, apparatuses and computer readable media are described that adjust connection states between a mobile wireless device and a wireless network upon detection of a connection state synchronization failure. After an interruption of a connection between the mobile wireless device and the wireless network, the mobile wireless device responds to a paging message received from the wireless network to establish a new radio resource control (RRC) connection or to re-establish an RRC connection with the wireless network, when an internal state of the mobile wireless device an at least a portion of contents of the paging message indicate the connection state synchronization failure.

20 Claims, 12 Drawing Sheets

ADJUSTING CONNECTION STATES OF A MOBILE WIRELESS DEVICE

CROSS-REFERENCE TO RELATED APPLICATIONS

This application claims the benefit of U.S. Provisional Application No. 61/657,772, filed Jun. 9, 2012 and entitled "METHOD FOR RETURNING FROM OUT OF SYNCHRONIZATION CONDITION FOR USER EQUIPMENT OPERATING IN LTE NETWORK" and of U.S. Provisional Application No. 61/664,126, filed Jun. 25, 2012 and entitled "METHOD FOR RETURNING FROM OUT OF SYNCHRONIZATION CONDITION FOR USER EQUIPMENT OPERATING IN LTE NETWORK," both of which are incorporated by reference herein in their entirety for all purposes.

TECHNICAL FIELD

The described embodiments generally relate to methods and apparatuses for managing connections states between mobile wireless devices and wireless networks. More particularly, the present embodiments describe adjusting connection states between a mobile wireless device and a wireless network upon detection of a connection state synchronization failure.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. Mobile wireless devices can include hardware and software to support wireless connections to different types of wireless networks that use different wireless communication technologies. Wireless networks using different radio access technologies (RATs) can overlap in geographic area coverage, and mobile wireless devices can support connections using different RATs depending on services and/or coverage available. A wireless service provider can provide services to mobile wireless devices through overlapping wireless networks, and mobile wireless devices can connect to one or more of the overlapping wireless networks. In a representative embodiment, a wireless service provider and/or a mobile wireless device can include simultaneous support for a Third Generation Partnership Project (3GPP) Long Term Evolution (LTE) wireless communication protocol and a "legacy" third generation (and/or earlier generation) wireless communication protocol. Representative "legacy" protocols include the Third Generation Partnership Project 2 (3GPP2) Code Division Multiple Access (CDMA) 2000 1x (also referred to as 1xRTT or 1x) wireless communication protocol, the 3GPP Universal Mobile Telecommunications System (UMTS) wireless communication protocol, and the 3GPP Global System for Mobile Communications (GSM) wireless communication protocol.

A dual network mobile wireless device that includes support for both CDMA 2000 1x and LTE is described as a representative device herein. The same teachings, however, can be applied to other mobile wireless devices that can operate in dual (or more generally multiple) wireless communication technology networks. In particular, the teachings disclosed herein can pertain to mobile wireless devices that switch transceivers from one wireless technology to another wireless technology and back again. The teachings provided herein can also apply to mobile wireless devices that operate under widely varying communication channel conditions using a single wireless technology, e.g., when a mobile wireless device encounters a deep fade that interrupts transmission and/or reception between the mobile wireless device and a wireless access network.

Dual chip mobile wireless devices can include separate signal processing chips that each can support a different wireless communication protocol, such as a first signal processing chip for a CDMA 2000 1x wireless network and a second signal processing chip for a LTE wireless network. In particular, in a dual chip mobile wireless device, each signal processing chip can include its own receive signal processing chain, including in some instances multiple receive antennas and attendant signal processing blocks for each signal processing chip. With separate radio frequency receive signaling chains available to each signal processing chip in the dual chip mobile wireless device, paging messages can be received independently from two different wireless networks, such as from the CDMA 2000 1x wireless network and from the LTE wireless network, by the dual chip mobile wireless device. Even when the dual chip mobile wireless device is connected and actively transferring data through one of the signal processing chips to one of the wireless networks, such as the LTE wireless network, the dual chip mobile wireless device can also listen for and receive a paging message through the other parallel signal processing chip from a second wireless access network, such as the CDMA 2000 1x wireless network. Thus, the dual chip mobile wireless device can establish a mobile device originating or mobile device terminating circuit switched voice connection through the CDMA 2000 1x wireless network while also being actively connected to (or simultaneously camped on) a packet switched LTE wireless network. Dual chip mobile wireless devices, however, can consume more power, can require a larger physical form factor and can require additional components (and cost more) than a more integrated "single chip" mobile wireless device.

A single chip mobile wireless device, at least in some configurations, can include a signal processing chip that can support different wireless communications protocols but can be unable to be actively connected to a first wireless access network and to receive communication from a second wireless access network simultaneously. The single chip mobile wireless device can support multiple wireless communication technologies, such as connections to a CDMA 2000 1x wireless network and to an LTE wireless network, but only to one wireless network at any given time. The single chip mobile wireless device can be limited to receiving signals that use one wireless communication technology type at a time, particularly when multiple antennas are used to receive signals for a single communication technology that supports receive diversity. In some embodiments, the single chip mobile wireless device can be referred to as a single radio mobile wireless device, where the "single radio" refers to a radio frequency receive signaling chain that can process one radio frequency technology at a time. In a representative embodiment, a single chip mobile wireless device is able to connect to or camp on an evolved Universal Mobile Telecommunications System (UMTS) Terrestrial Radio Access Network (eUTRAN) of an LTE (or LTE-Advanced) wireless network and also to connect to or camp on a radio access network (RAN) of the CDMA 2000 1x wireless network, but not to both wireless networks simultaneously. The single chip mobile wireless device can be registered on both the LTE wireless network and on the CDMA 2000 1x wireless network and can therefore form connections with each wireless network singly but not simultaneously. The single chip mobile wireless device can be connected on the LTE wireless network and can interrupt the connection to the LTE wireless network to maintain registration on the CDMA 2000 1x wireless network. During the interrupted connection, control signaling and responses to received transmissions between the mobile wireless device and the wireless access network portion of the LTE wireless network can be interrupted. Packet transmissions and/or signaling messages from the LTE wireless network to the single chip mobile wireless device can be dropped. For sufficiently long interruptions, the LTE wireless network can drop a connection with the single chip mobile wireless device. Upon returning to the LTE wireless network from the CDMA 2000 1x wireless network, the mobile wireless device can assume a "connected" connection state still exists with the LTE wireless network, while the LTE wireless network can assume an "idle" connection state exists with the mobile wireless device. The LTE wireless network can send signaling messages to the mobile wireless device appropriate for the "idle" connection state, and the mobile wireless device can discard the signaling messages when not appropriate for the "connected" connection state. The performance of higher layer applications can be adversely affected by this misalignment of connection states between the mobile wireless device and the LTE wireless network. Thus, there exists a need to compensate for connection interruptions between a mobile wireless device and a wireless access network to adjust connection states of the mobile wireless device to improve performance of connections between the mobile wireless device and the wireless access network.

This application describes methods by which a mobile wireless device can operate in a multiple wireless network environment and/or a time varying single network environment and adjust connections states after connection interruptions between the mobile wireless device and an access network portion of a wireless network.

SUMMARY OF THE DESCRIBED EMBODIMENTS

Broadly speaking, the described embodiments relate to methods and apparatuses for managing connections states between mobile wireless devices and wireless networks. More particularly, the present embodiments describe adjusting connection states between a mobile wireless device and a wireless network upon detection of a connection state synchronization failure.

In an embodiment, a method to adjust connections states by a mobile wireless device in communication with a wireless access network is described. The method includes at least the following steps executed by the mobile wireless device. The mobile wireless device receives a paging message from the wireless access network. The mobile wireless device determines that an internal state of the mobile wireless device and at least a portion of contents of the paging message indicate a connection state synchronization failure for a first radio resource control (RRC) connection between the mobile wireless device and the wireless access network. The mobile wireless device responds to the paging message by establishing a second RRC connection with the wireless access network. In a representative embodiment, the method further includes the mobile wireless device changing an internal state of the mobile wireless device from an RRC connected state to an RRC idle state to release the first RRC connection before establishing the second RRC connection with the wireless access network.

In another embodiment, a mobile wireless device is described. The mobile wireless device includes at least one or more processors, a transmitter and one or more receivers. The one or more processors are configured to control establishing and releasing connections between the mobile wireless device and a first wireless access network and a second wireless access network. The transmitter is configured to transmit signals to the first wireless access network according to a first wireless communication protocol and to the second wireless access network according to a second wireless communication protocol. The one or more receivers are configured to receive signals from the first and second wireless access networks. The one or more processors are further configured to establish a first RRC connection to the first wireless access network. The one or more processors are configured to switch the one or more receivers from the first wireless access network to receive signals from the second wireless access network. The one or more processors are further configured to re-configure the one or more receivers of the mobile wireless device from the second wireless access network to receive signals from the first wireless access network. The one or more processors of the mobile wireless device are also configured to obtain a paging message from the first wireless access network. The one or more processors are configured to determine that an internal state of the mobile wireless device and at least a portion of contents of the paging message indicate a connection state synchronization failure for a first radio resource control (RRC) connection between the mobile wireless device and the first wireless access network. The one or more processors are configured to establish a second RRC connection to the first wireless access network. In a representative embodiment, the one or more processors of the mobile wireless device determine that an internal state of the mobile wireless device and at least a portion of contents of the paging message indicate a connection state synchronization failure for a first radio resource control (RRC) connection between the mobile wireless device and the wireless access network by determining one or more of the following conditions. The one or more processors determine that: (1) the internal state of the mobile wireless device indicates an RRC connected state, (2) the paging message includes a first information element indicating that the paging message originates from a packet switched (PS) domain, (3) the paging message includes a second information element that uniquely identifies the mobile wireless device, (4) the paging message is not a public warning system message, (5) the paging message does not include an indication of a change in system information from the wireless access network, and (6) at least one signaling radio bearer and at least one data radio bearer are established for communication between the mobile wireless device and the wireless access network.

In another embodiment, a computer program product encoded as computer program code in a non-transitory computer readable medium for adjusting connections states by a mobile wireless device in communication with a wireless access network is described. The computer program product includes at least the following computer program code. Computer program code for receiving a paging message from the wireless access network. Computer program code for determining that an internal state of the mobile wireless device and at least a portion of contents of the paging message indicate a connection state synchronization failure for a first radio resource control (RRC) connection between the mobile wireless device and the wireless access network. Computer program code for responding to the paging message by establishing a second RRC connection with the wireless access network. In a representative embodiment, the computer program code establishes the second RRC connection with the wireless access network by (1) releasing the first RRC connection and executing an RRC connection establishment procedure with the wireless access network, or (2) executing an RRC re-establishment procedure with the wireless access network.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
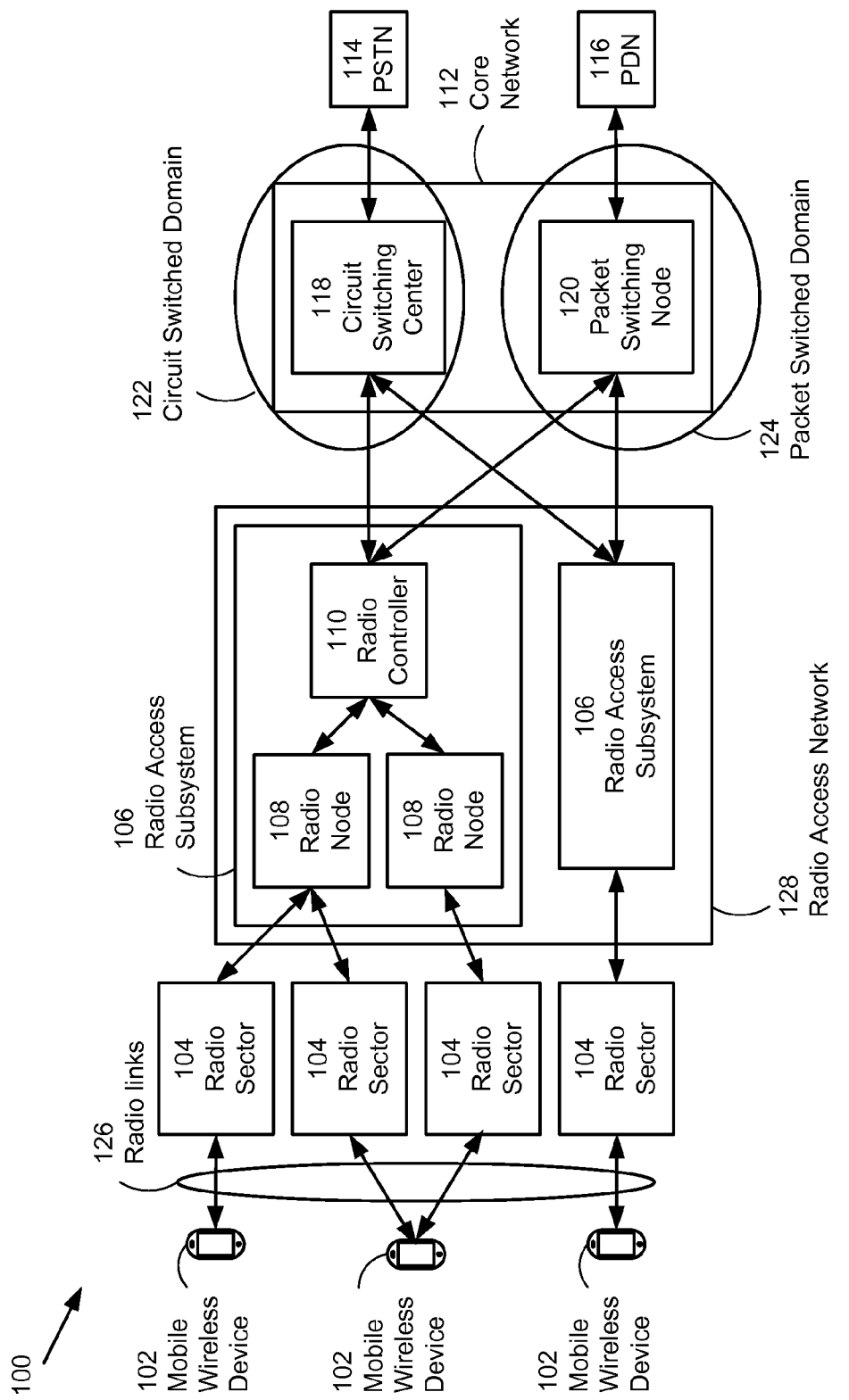
FIG. 1 illustrates components of a generic wireless communication network.

Wireless networks continue to evolve as network operators deploy equipment for new wireless communication technologies based on ongoing standardization efforts. Mobile wireless devices can provide capabilities to communicate with wireless networks based on two or more different wireless communication technologies, e.g. GSM and UMTS, UMTS and LTE, or CDMA 2000 1x and LTE, as newer wireless network technologies offer advanced capabilities in parallel with earlier wireless network technologies that can provide greater geographic area coverage and/or varying wireless service implementations. Different wireless communication technologies can require different hardware and software processing to transmit and receive wireless signals, and a mobile wireless device can include multiple, separate signal processing chips to encode and decode wireless signals according to the different wireless communication technologies. A dual chip mobile wireless device, for example, can include one chip for a CDMA 2000 1x wireless network and a second chip for an LTE wireless network. With sufficient parallel analog hardware, the dual chip mobile wireless device can communicate with one or both of the wireless networks simultaneously. Dual chip mobile wireless devices, however, can be more complex, larger, more costly and more power intensive than single chip mobile wireless devices. In some embodiments, a single chip mobile wireless device can provide a simpler, smaller, more cost effective and more power efficient mobile wireless device than a dual chip mobile wireless device. The single chip mobile wireless device can communicate with one wireless network at a time out of multiple wireless networks and can provide limited (if any) simultaneous connection capabilities for other parallel wireless networks.

It should be understood that implementations of the same methods and apparatuses described herein can apply to mobile wireless devices that operate in different types of wireless networks, particularly one or more wireless networks that offer connections using two or more different generations or types of wireless communication protocols. For example, the same teachings can be applied to a combination of GSM and UMTS networks, LTE and UMTS networks, LTE and CDMA 2000 1x networks or other "combined" multiple radio access technology (multi-RAT) wireless networks. A specific example and implementation described herein in relation to CDMA 2000 1x-RTT and LTE wireless networks is presented for simplicity, but the methods and apparatuses disclosed herein can also apply equally to other wireless network environments that use other combinations of wireless access communication protocols. The methods and apparatuses described herein can apply to mobile wireless devices in which a connection to a wireless access network is interrupted and then later resumed. Interruption of the connection between the mobile wireless device and the wireless access network can occur when the mobile wireless device configures one or more receivers to operate on a second wireless access network, e.g., to listen for signaling messages from the second wireless access network, thereby interrupting a connection to the first wireless access network. Interruption of the connection to a wireless access network can also occur when a mobile wireless device encounters an extended time interval with poor signal receive signal quality, e.g., during a deep multi-path signal fade. Upon resumption of a connection between the mobile wireless device and the wireless access network, e.g., in response to reconfiguring the one or more receivers back to a first wireless access network (from a second wireless access network) or to improved signal quality reception by the mobile wireless device (after a period of poor receive signal quality), a radio resource control (RRC) connection state of the mobile wireless device and of the wireless access network can become misaligned. The mobile wireless device can have an internal state indicating an RRC connected state, while the wireless access network can have a state indicating an RRC idle state. As certain signaling messages, e.g., paging messages having information elements set to particular values, can be valid while in an RRC idle state but invalid in an RRC connection state, the mobile wireless device can ignore the signaling messages and thereby miss communications from the wireless access network. In representative embodiments described herein, the mobile wireless device can determine a synchronization state failure occurrence in conjunction with a received paging message and can subsequently take actions to realign connection states with a wireless access network.

In some embodiments described herein, a single chip mobile wireless device can be capable of receiving wireless radio frequency signals from an LTE wireless network or from a CDMA 2000 1x wireless network individually but not from both wireless networks simultaneously (or in some instances, with only limited reception capabilities from both wireless networks simultaneously). Initially, the single chip mobile wireless device can be associated with the LTE wireless network, e.g. connected to or camped on the LTE wireless network. The single chip mobile wireless device can be registered simultaneously with both the LTE wireless network and with the CDMA 2000 1x wireless network. The single chip mobile wireless device can interrupt a packet switched data connection with the LTE wireless network in order to communicate with the CDMA 2000 1x wireless network, e.g., to listen for a page addressed to the mobile wireless device for a mobile terminated circuit switched voice connection to the CDMA 2000 1x wireless network. Alternatively, the single chip mobile wireless device can interrupt the connection with the LTE wireless network in order to communicate with the CDMA 2000 1x wireless network to maintain registration of the mobile wireless device on the CDMA 2000 1x wireless network. The single chip mobile wireless device can suspend a packet switched data connection with the LTE wireless network in order to communicate with and/or listen to the CDMA 2000 1x wireless network; however, a higher layer radio resource connection, such as an RRC connection for signaling between the single chip mobile wireless device and the LTE wireless network, can remain undisturbed during the suspension of the packet switched data connection. (In some embodiments, the LTE wireless network can be unaware that the mobile wireless device suspended communication and can observe a gap in communication between the LTE wireless network and the mobile wireless device.) The single chip mobile wireless device can configure a receiver (with one or more antennas) contained in the single chip mobile wireless device away from the LTE wireless network and to the CDMA 2000 1x wireless network to listen for paging messages from the CDMA 2000 1x wireless network or to transmit signaling messages to the CDMA 2000 1x wireless network. The single chip mobile wireless device can subsequently re-configure the receiver back to the LTE wireless network. Interruption of the packet switched data connection (and of a parallel higher layer signaling connection) to the LTE wireless network can be accommodated without the LTE wireless connection being dropped, e.g., when the interruption is less than any timer expiration limits that would precipitate dropping the connection with the mobile wireless device. Active data transfer between the LTE wireless network and the single chip mobile wireless device as well as signaling messages during the suspension period can be interrupted and later resumed when the mobile wireless device returns to the LTE wireless network. During the interruption, the LTE wireless network can send data packets and/or signaling messages to the mobile wireless device and can receive no acknowledgement (ACK) messages or any negative acknowledgement (NACK) messages in response, and after a period of time, the LTE wireless network can interpret the interruption as a loss of the RRC connection to the mobile wireless device. The LTE wireless network can change a state for the mobile wireless device maintained by the LTE wireless network from an RRC connected state to an RRC idle state. The LTE wireless network can send paging messages to the mobile wireless device to re-establish connection with the mobile wireless device, e.g., when a active data transfer has been interrupted by the "tune-away" configuration and re-configuration of the receivers of the mobile wireless device. The mobile wireless device can ignore paging messages for establishing a data connection to the mobile wireless device communicated to the mobile wireless device by the LTE wireless network as being invalid because the internal state of the mobile wireless device is an RRC connected state, i.e. the mobile wireless device believes it is already connected to the LTE wireless network. Recovery from the misaligned RRC connection states can adversely affect performance of higher layer applications, as data packet communication between the mobile wireless device and the LTE wireless network can be interrupted until the RRC connection states are realigned. In a representative embodiment, the mobile wireless device determines the misaligned RRC connection states and responds to the paging message in order to realign the connection states.

In some embodiments, a mobile wireless device can encounter a deep multi-path fade that can interrupt communication between the LTE wireless network and the mobile wireless device for a period of time. During the loss of connection between the mobile wireless device and the LTE wireless network, the LTE wireless network can receive no signaling messages and can change the RRC connection state to an RRC idle state. When the mobile wireless device recovers from the deep multi-path fade, the RRC connection state at the mobile wireless device can continue to be an RRC connected state. Thus, a deep multi-path fade (or other signal interference that interrupts communication between the mobile wireless device and the LTE wireless network) can result in misaligned RRC connection states. As described above, the mobile wireless device can determine connection state synchronization failure and can undertake a number of actions to realign the connection states between the mobile wireless device and the LTE wireless network.

Valid paging messages sent from an LTE wireless network to a mobile wireless device while in an RRC connected state are restricted to a few particular message types that occur infrequently. Any paging messages received by the mobile wireless device while in an RRC connected state can be inspected to determine if a state synchronization failure has occurred. Testing for errant paging message that indicate a state synchronization failure can include testing for the following conditions. The mobile wireless device, in an embodiment, can determine that a paging message indicates (indirectly) that a state synchronization failure has occurred when all of the conditions are met. (1) The paging message contains a first information element (IE) that indicates that the paging message originates from a packet switched (PS) domain. A representative first IE is a core network (CN) domain IE, which can indicate that the paging message originates from a PS domain or from a CS domain. (2) The paging message contains a second information element that uniquely identifies the mobile wireless device. A representative second IE is a user equipment (UE) identification (ID) IE containing an SAE temporary mobile subscriber identity (S-TMSI) or an international mobile subscriber identity (IMSI). (3) The paging message is not a public warning system (PWS) message. A representative PWS message is a commercial mobile alert service (CMAS) message or an earthquake and tsunami warning system (ETWS) message. (4) The paging message does not include an indication of a change in system information from the LTE wireless network. (5) At least one signaling radio bearer is established between the mobile wireless device and the LTE wireless network. In a representative embodiment, the at least one signaling radio bearer includes a type 2 signaling radio bearer (SRB2). (6) At least one data radio bearer is established between the mobile wireless device and the LTE wireless network.

When determining that an RRC connection state synchronization failure has occurred, the mobile wireless device can remedy the failure by establishing anew the RRC connection to the LTE wireless network. In an embodiment, the mobile wireless device updates an internal state of the mobile wireless device from an RRC connected state to an RRC idle state, thereby releasing the RRC connection to the LTE wireless network. The mobile wireless device than establishes a new RRC connection to the LTE wireless network. In another embodiment, the mobile wireless device sends an RRC re-establishment request message to the LTE wireless network to re-establish the RRC connection.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

Paging messages can be used to establish connections between the mobile wireless device 102 and the radio access network 128, e.g., to cause the mobile wireless device to move from a idle state to a connected state. While in the connected state, paging messages sent from the radio access network 128 to the mobile wireless device 102 can be limited to providing indications about changes in system information, which can occur infrequently, and to providing emergency public warning service messages. As the mobile wireless device 102 is connected to the radio access network 128 by one or more signaling radio bearers (through which signaling messages can be communicated) and by one or more data radio bearers (through which data packets can be communicated), there is limited need for paging messages. In particular, there is no requirement for paging messages to establish a connection once a connection is already established. Paging messages then directed to establish a connection, when the mobile wireless device 102 is already connected, can be ignored.

Radio resources that form the radio links 126 in the radio sectors 104 can be shared among multiple mobile wireless devices 102 using a number of different multiplexing techniques, including time division, frequency division, code division, space division and combinations thereof. A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102. Suspension of allocation of radio resources to a mobile wireless device 102 can occur without dis-establishing the radio resource signaling connection to the mobile wireless device 102.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
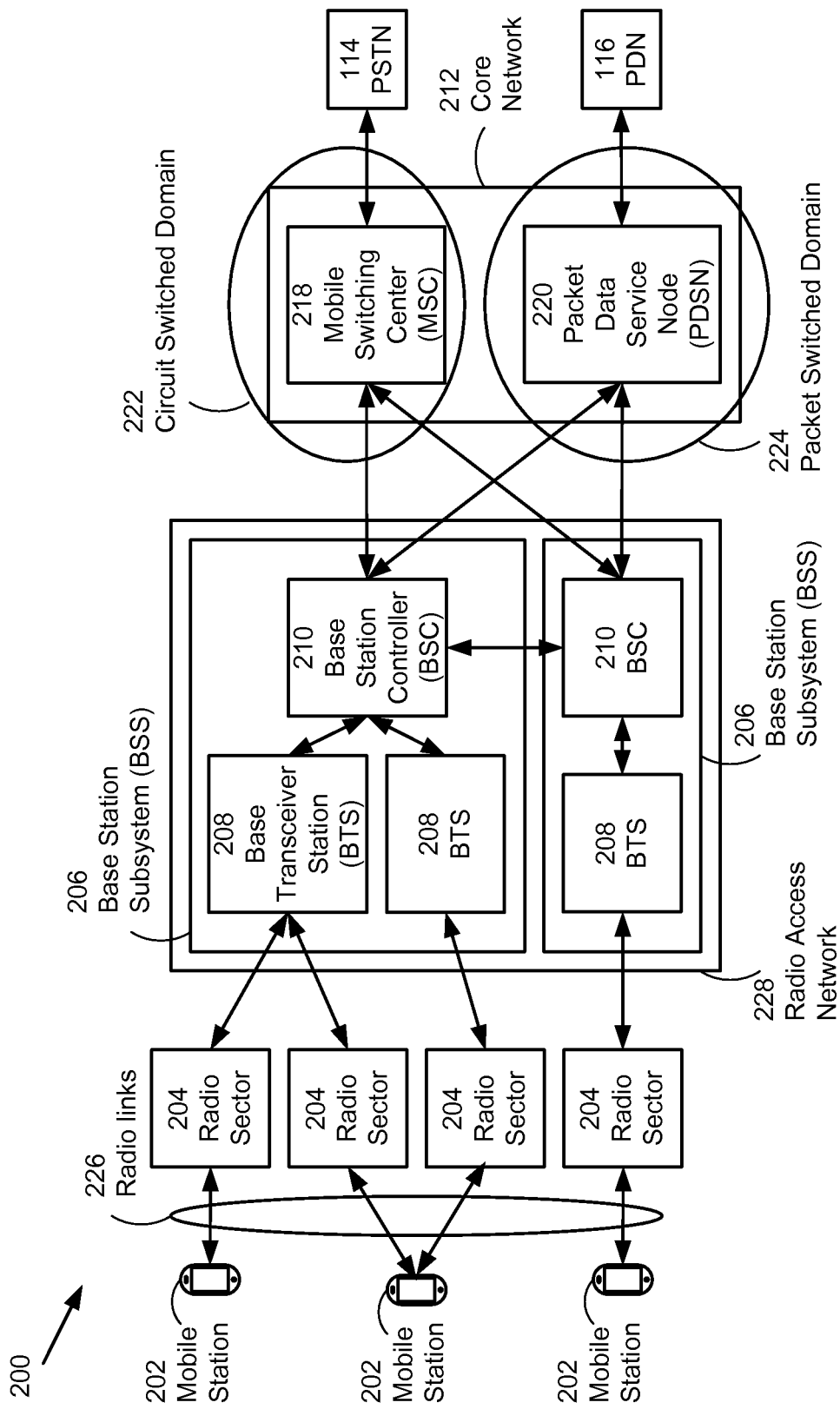
FIG. 2 illustrates components of a CDMA 2000 1x (RTT or EV-DO) wireless communication network.

FIG. 2 illustrates a representative CDMA 2000 1x wireless network 200 that can include elements comparable to those described for the generic wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA 2000 1x wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA 2000 1x wireless network 200.

Figure 3:
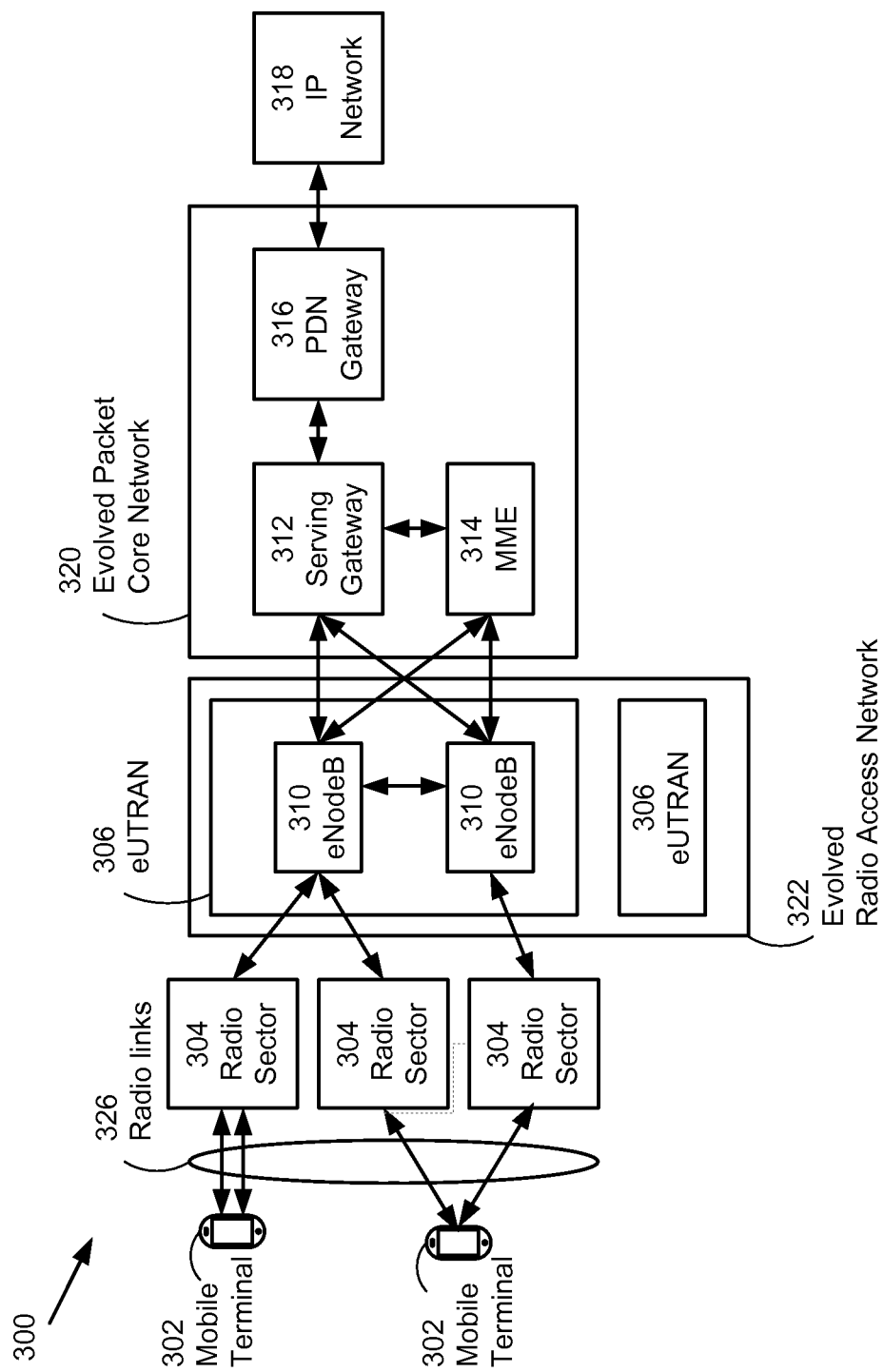
FIG. 3 illustrates components of an LTE (or LTE-Advanced) wireless communication network.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both transmitting and receiving base stations (such as the BTS 208 in the CDMA 2000 1x wireless network 200) as well as base station radio controllers (such as the BSC 210 in the CDMA 2000 1x wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the mobile terminal 302. The eNodeB 310 can control allocation of radio resources for the radio links 326 to the mobile terminals 302. The eNodeB 310 can communicate paging messages to the mobile wireless device 102, including paging messages to establish an RRC connection with the mobile wireless device 102 and transition from an RRC idle state to an RRC connected state. The mobile wireless device 102 can be required to be in an RRC connected state in order to communicate application data packets and signaling messages. An RRC connection establishment procedure can start with the mobile wireless device 102 sending an RRC connection request message to the eNodeB 310. When the LTE network 300 seeks to establish an RRC connection with the mobile wireless device 102, the eNodeB 310 sends a paging message to the mobile wireless device 102. The mobile wireless device 102 in turn responds to the paging message by initiating the RRC connection establishment procedure.

Figure 4:
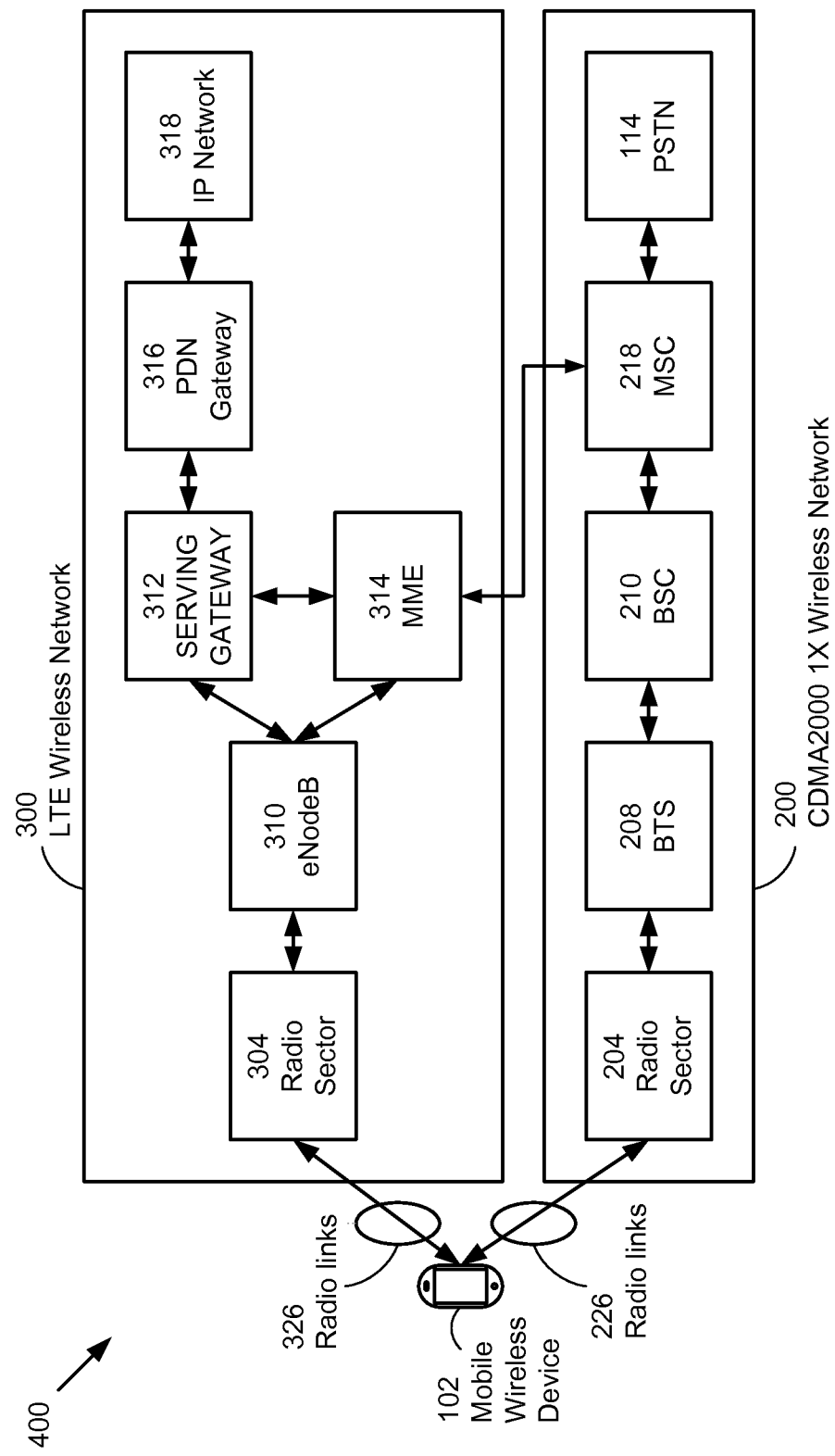
FIG. 4 illustrates a mobile wireless device communicating in parallel to the CDMA 2000 1x (RTT or EV-DO) wireless communication network of FIG. 2 and the LTE (or LTE-Advanced) wireless communication network of FIG. 4.

FIG. 4 illustrates a mobile wireless device 102 in communication with both the LTE wireless network 300 and with the CDMA 2000 1x wireless network 200. The CDMA 2000 1x wireless network 200 can connect to the circuit switch based public switched telephone network (PSTN) 114 through a mobile switching center (MSC) 218. The MSC 218 of the CDMA 2000 1x wireless network 200 can be interconnected to the MME 314 of the LTE wireless network 300 to coordinate call signaling for the mobile wireless device 102. In some embodiments, the CDMA 2000 1x wireless network 200 can seek to establish a connection through the radio links 226 with the mobile wireless device 102, e.g. to establish a voice connection between the mobile wireless device 102 and the PSTN 114. The CDMA 2000 1x wireless network 200 can transmit a page message to the mobile wireless device 102 using the radio links 226 to indicate the availability of an incoming voice connection. Unless a receiver in the mobile wireless device 102 is tuned to listen for the page message from the CDMA 2000 1x wireless network 200 during the appropriate paging interval, the mobile wireless device 102 can be connected to the LTE wireless network 300 during the paging interval and can be unaware of the incoming voice connection. A dual chip mobile wireless device 102 can be connected to the LTE wireless network 300 and listen to the CDMA 2000 1x wireless network 200 simultaneously, but a single chip mobile wireless device 102 with limited receive capabilities can be only capable of listening to one cellular wireless network at a time. The single chip mobile wireless device 102 can periodically listen for page messages from the CDMA 2000 1x wireless network 200 by tuning a receiver from the LTE wireless network 300 to the CDMA 2000 1x wireless network 200 temporarily and subsequently re-tuning the receiver back to the LTE wireless network 300. Signaling messages and/or data packets from the LTE wireless network 300 can be dropped while the signal chip mobile wireless device 102 listens for messages from or communicates signaling messages to the CDMA 2000 1x wireless network 200. Without receipt of acknowledgement messages for data packets sent to the mobile wireless device 102, the LTE wireless network 300 can conclude that the communication link to the mobile wireless device 102 is broken and after a period of inactivity in which data messages and/or signaling messages are not acknowledged, the LTE wireless network 300 can transition to an RRC idle state, thereby severing the RRC connection with the mobile wireless device 102. As a result, when the mobile wireless device returns to communicating over the radio links 326 to the radio sector 304 of the eNodeB 310 of the LTE wireless network 300, the eNodeB 310 can send paging messages to the mobile wireless device 102 to establish an RRC connection anew. The mobile wireless device 102 can ignore the paging messages, and as a result, the RRC connection states of the mobile wireless device 102 and the eNodeB 310 of the LTE wireless network 300 can be misaligned.

Figure 5:
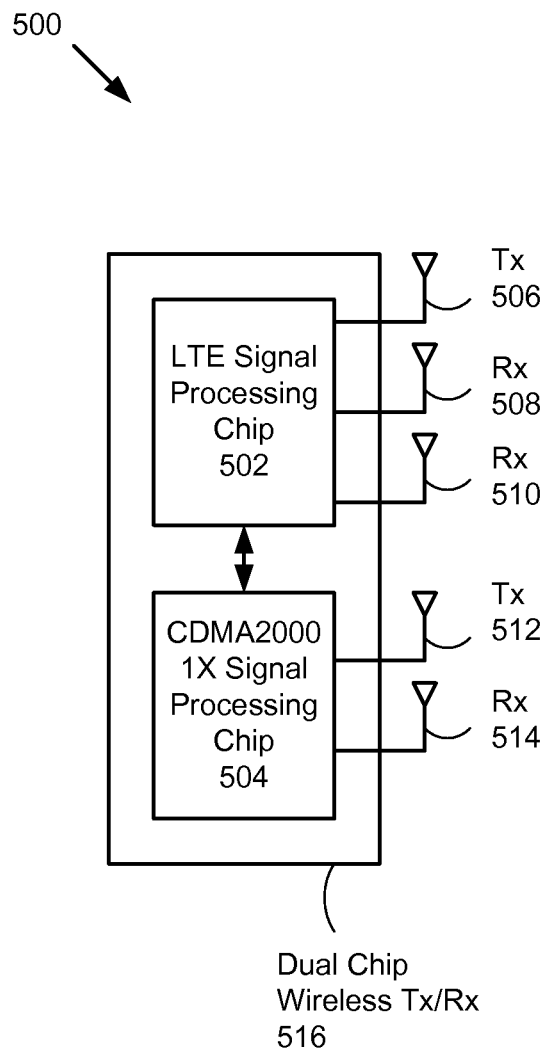
FIG. 5 illustrates elements of a prior art dual signal processing chip mobile wireless device.

FIG. 5 illustrates select wireless signal processing elements 500 that can be contained in a prior art dual chip wireless transmitter/receiver (TX/RX) 516 within a dual chip mobile wireless device 102. An LTE signal processing chip 502 can be used for connections between the dual chip mobile wireless device 102 and the LTE wireless network 300, while a CDMA 2000 1x signal processing chip 504 can be used for connections between the dual chip mobile wireless device 102 and the CDMA 2000 1x wireless network 200. Each signal processing chip can be connected to a set of antennas through which radio frequency signals can be transmitted and received with respective wireless networks. The LTE signal processing chip 502 can be connected to a transmitting antenna 506 and to a pair of receive antennas 508/510. Multiple receive antennas can be used to improve performance through various forms of receive diversity and can be required based on a standardized wireless communication protocol. With the separate CDMA 2000 1x signal processing chip 504, the dual chip mobile wireless device 102 can transmit and receive radio frequency signals with the CDMA 2000 1x wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing chip 502 and the CDMA 2000 1x signal processing chip 504 can be connected to each other in order to coordinate radio frequency signal communication with their respective wireless networks. The dual chip wireless transmitter/receiver 516, while flexible, can be more expensive, consume more power and occupy more space than a compact, low power single chip wireless transmitter/receiver as shown in FIG. 6.

Figure 6:
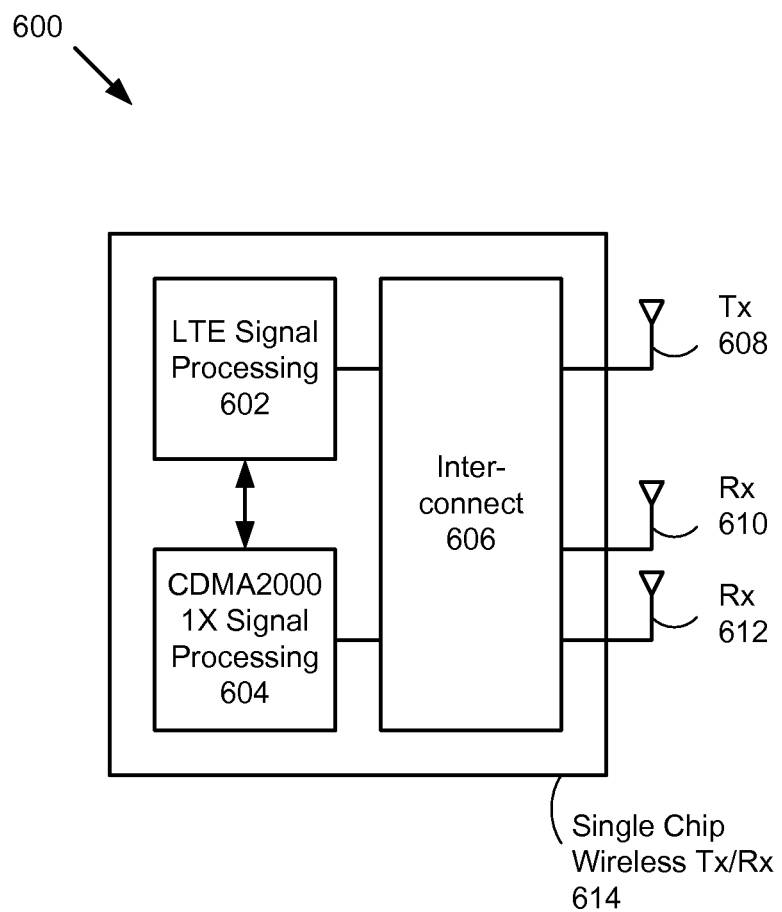
FIG. 6 illustrates elements of a representative single signal processing chip mobile wireless device.

FIG. 6 illustrates a single chip wireless transmitter/receiver 614 that can reside in a single chip wireless mobile wireless device 102 that can communicate with the LTE wireless network 300 or the CDMA 2000 1x wireless network 200 separately but not simultaneously. When connected to the LTE wireless network 300, the single chip mobile wireless device 102 can use a single transmitter (Tx) 608 and dual receivers (Rx) 610/612. When connected to the CDMA 2000 1x wireless network 200, the single chip mobile wireless device 102 can use the single transmitter 608 and either one receiver (Rx 610 or Rx 612) or dual receivers (Rx 610 and Rx 612). Use of dual receivers for both the LTE wireless network 300 and the CDMA 2000 1x wireless network 200 can provide higher receive signal quality and therefore higher data throughput and/or greater connection reliability under adverse signal conditions. An interconnect block 606 can allow either an LTE signal processing 602 block or a CDMA 2000 1x signal processing block 604 to transmit and receive radio signals through the transmitter 608 and one or both of the receivers 610/612 respectively. Within the single chip wireless mobile wireless device 102, the single chip wireless transmitter/receiver 614 can be connected to an application processor (not shown) that can perform "higher layer" functions such as establishing connections for applications and forming messages to be communicated with various wireless networks, while the single chip wireless transmitter/receiver 614 can perform "lower layer" functions such as ensuring integrity of transmitted and received radio frequency signals that carry messages for the application processor.

Figure 7:
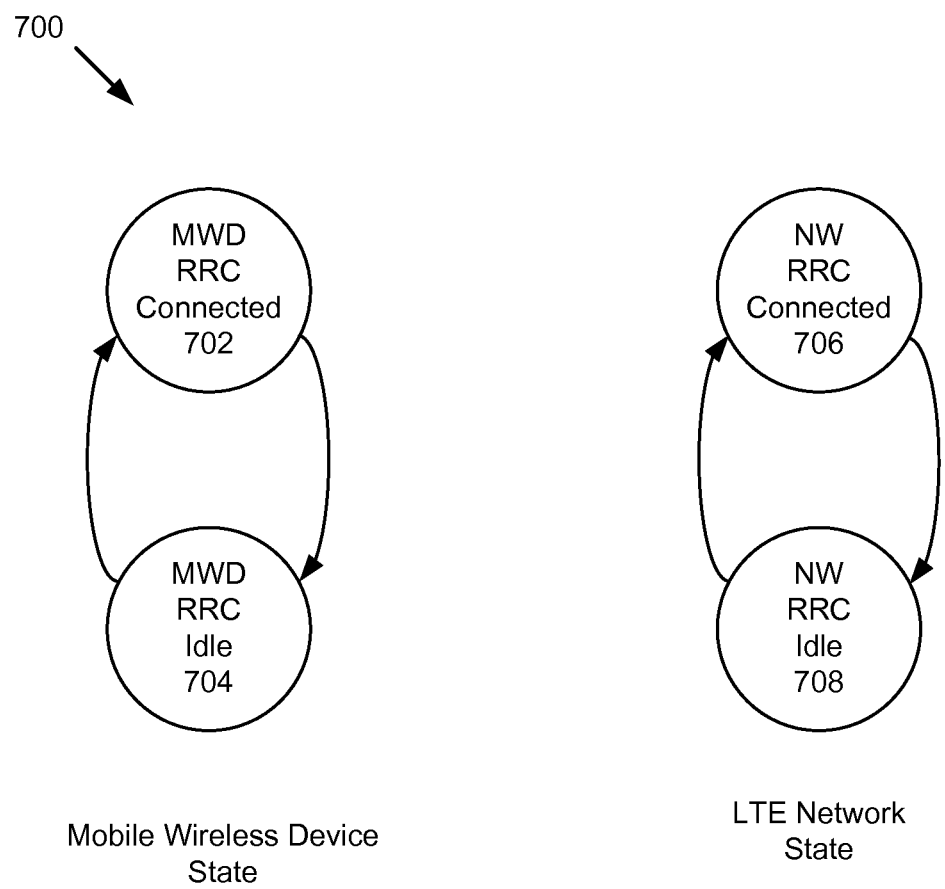
FIG. 7 illustrates radio resource control (RRC) connection states for a mobile wireless device and a wireless access network.

FIG. 7 illustrates a state diagram 700 for radio resource control (RRC) connection states for the mobile wireless device 102 and a wireless access network, e.g., the LTE wireless network 300 (or an eNodeB 310 contained therein). The mobile wireless device 102 can be in an RRC connected state 702 or an RRC idle state 704. Similarly the LTE wireless network 300 can be in the RRC connected state 706 or the RRC idle state 708. The RRC connection establishment procedure can be used to transition the mobile wireless device 102 and the LTE wireless network 300 from an RRC idle state 704/708 to an RRC connected state 702/704. When the RRC connection state of the LTE wireless network 300 does not match the RRC connection state of the mobile wireless device 102, a state mismatch, or equivalently a state synchronization failure, can occur. The state synchronization failure can occur when the mobile wireless device 102 tunes its receivers to a second wireless network (e.g., the CDMA 2000 1x wireless network 200) to listen for signaling messages. If the "tune away" time period extends for a "long" period of time, e.g., over which one or more times can expire at the eNodeB 310 of the LTE wireless network 300, the eNodeB 310 can drop the RRC connection with the mobile wireless device 102 and return to the RRC idle state 708, while the mobile wireless device 102 can remain (internally) in the RRC connected state 702. Similarly, when an extended signal fade occurs between the mobile wireless device 102 and the LTE wireless network 300, the eNodeB 310 can drop the RRC connection resulting in a misaligned RRC connection state between the mobile wireless device 102 and the eNodeB 310 of the LTE wireless network 300.

Figure 8:
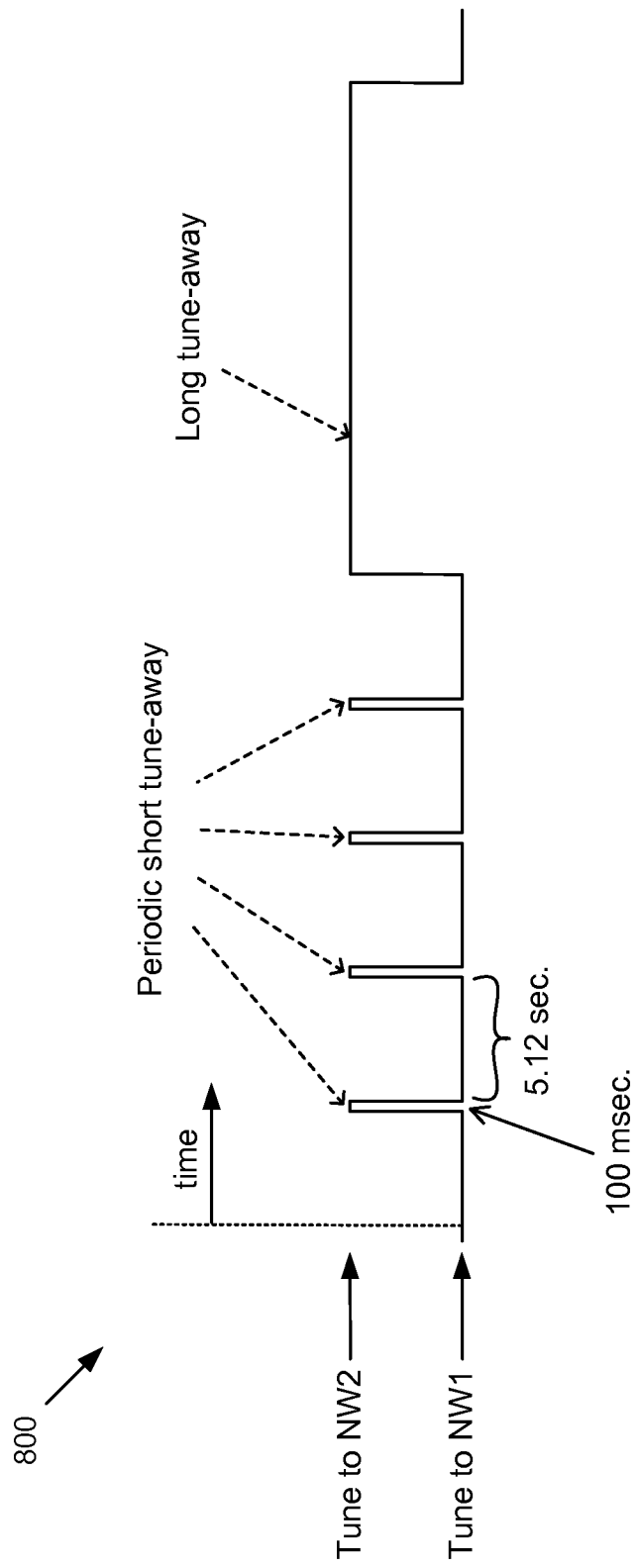
FIG. 8 illustrates configuring and reconfiguring of receiver (s) of a mobile wireless device to two different wireless access networks.

FIG. 8 illustrates configuring and reconfiguring of receiver(s) of the mobile wireless device 102 to two different wireless access networks, e.g., the LTE wireless network 300 (NW1) and the CDMA 2000 1x wireless network 200 (NW2). The mobile can be capable of receiving wireless radio frequency signals from the LTE wireless network 300 or from a CDMA2000 1x wireless network 200 individually but not from both wireless networks simultaneously (or in some instances, with only limited reception capabilities from both wireless networks simultaneously). Initially, the mobile wireless device 102 can be associated with the LTE wireless network 300, e.g. connected to or camped on the LTE wireless network 300. In an embodiment, the mobile wireless device 102 can be registered simultaneously with both the LTE wireless network 300 and with the CDMA2000 1x wireless network 200. The CDMA2000 1x wireless network 200 can seek to establish a connection with the mobile wireless device 102 by sending a paging message including a page addressed to mobile wireless device 102 during a paging interval. The mobile wireless device 102 can tune a receiver away from the LTE wireless network 300 and to the CDMA2000 1x wireless network 200 to listen for a paging message that includes a page addressed to the mobile wireless device 102. If no paging message that includes a page addressed to the mobile wireless device 102 is received from the CDMA2000 1x wireless network 200, then the mobile wireless device 102 can retune the receiver back to the LTE wireless network 300 in a relatively short time period, e.g. within approximately 100 ms. In order to listen for pages addressed to the mobile wireless device 102 from the CDMA2000 1x wireless network (NW2), the mobile wireless device 102 can tune a receiver to the CDMA2000 1x wireless network 200 during regular paging intervals. In an embodiment, a CDMA2000 1x wireless network 200 can operate with a paging cycle of approximately 5.12 seconds. This process of listening for pages from a second wireless network with a paging cycle of 5.12 seconds and quickly retuning back to a first wireless network (i.e., within 100 ms) is shown in FIG. 8 as a periodic short tune away.

After receiving a page addressed to the mobile wireless device 102 from the CDMA2000 1x wireless network 200, the mobile wireless device 102 can establish a connection with the CDMA2000 1x wireless network 200. The connection between the mobile wireless device 102 and the CDMA2000 1x wireless network 200 can result in a long interruption to data traffic and signaling traffic between the mobile wireless device 102 and the LTE wireless network 300. This long connection to the CDMA 2000 1x wireless network (NW2) is shown as a long tune away in FIG. 8. Downlink and uplink radio resources assigned by the LTE wireless network 300 to the mobile wireless device 102 can remain unused during this long interruption if not suspended beforehand, which can unnecessarily waste scarce radio resources in the access network portion of the LTE wireless network 300. A radio resource control (RRC) connection to the LTE wireless network (NW1) can eventually time out due to a lack of acknowledgements being sent from the mobile wireless device 102 to the LTE wireless network 300. The RRC connection at the eNodeB 310 of the LTE wireless network 300 can change to the RRC idle state 708, and the connection between the mobile wireless device 102 and the LTE wireless network 300 can be dropped. After tuning the receiver of the mobile wireless device 102 back to the LTE wireless network 300, the mobile wireless device 102 can be required to re-establish a new RRC connection with the LTE wireless network 300. The mobile wireless device 102 can be unaware of the change of RRC connection state at the eNodeB 310 of the LTE wireless network 300 and can continue to use an RRC connected state 702. Therefore, a long tune away having an extended time period can result in interrupted communication between the mobile wireless device 102 and the LTE wireless network 300 and can result in a misaligned RRC connection state between the mobile wireless device 102 and the LTE wireless network 300.

Figure 9:
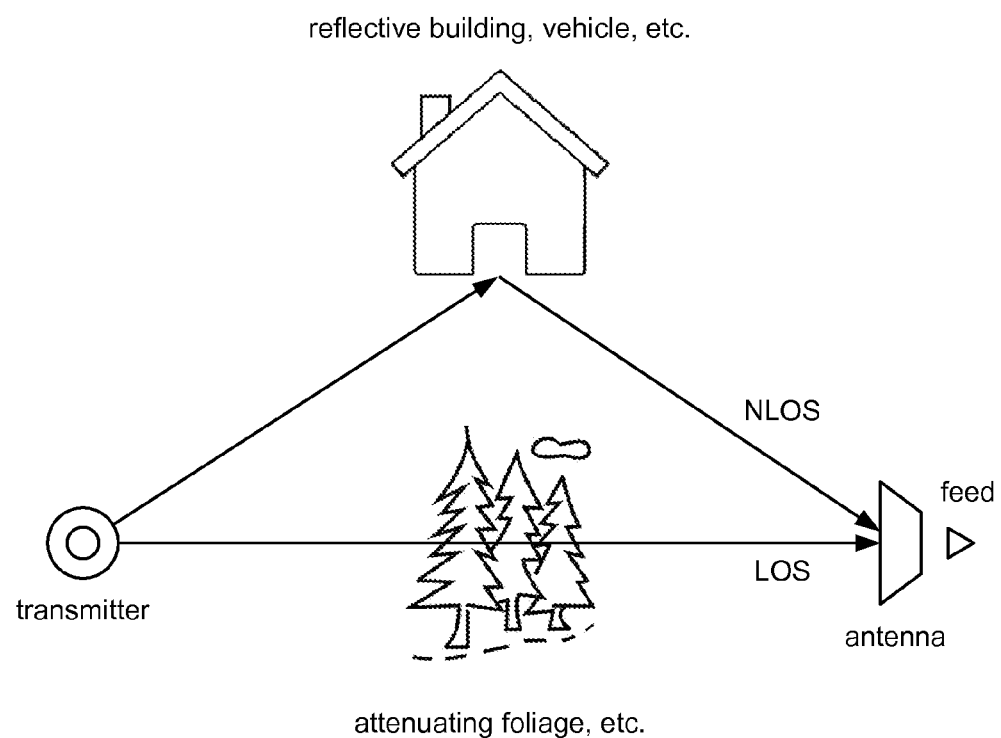
FIG. 9 illustrates signal fading interference in a wireless communication system.

FIG. 9 illustrates signal fading interference in a wireless communication system. Signal fading can occur when a radio signal from the wireless network is attenuated due to multi-path propagation or shadowing from obstacles. In multi-path propagation, radio signals can reach the receiving antenna of the mobile wireless device 102 through two or more paths, resulting in multi-path interference at the receiver of the mobile wireless device 102. Multi-path interference can be caused by atmospheric ducting, reflection and/or refraction from the ionosphere, and reflection from buildings, vehicles, water bodies and other terrestrial objects such as mountains. Multi-path effects on received signals can include constructive and destructive interference, and phase shifting. Destructive interference can result in fading of the received signal. Multi-path propagation is generally associated with non-line-of-sight (NLOS) signals. Shadowing by large obstruction such as foliage, a hill or a large building can obscure a main signal path between a transmitter at the wireless network and the receiver of the mobile wireless device 102, thereby also resulting in signal fading. Shadowing is generally associated with line-of-sight (LOS) signals. When a received signal encounters severe shadowing and/or multi-path interference, the signal fading can result in extended interruptions of communication between the mobile wireless device 102 and the wireless network. Thus, an extended signal fade can also result in misalignment of RRC connection states between the mobile wireless device 102 and the wireless network.

Figure 10:
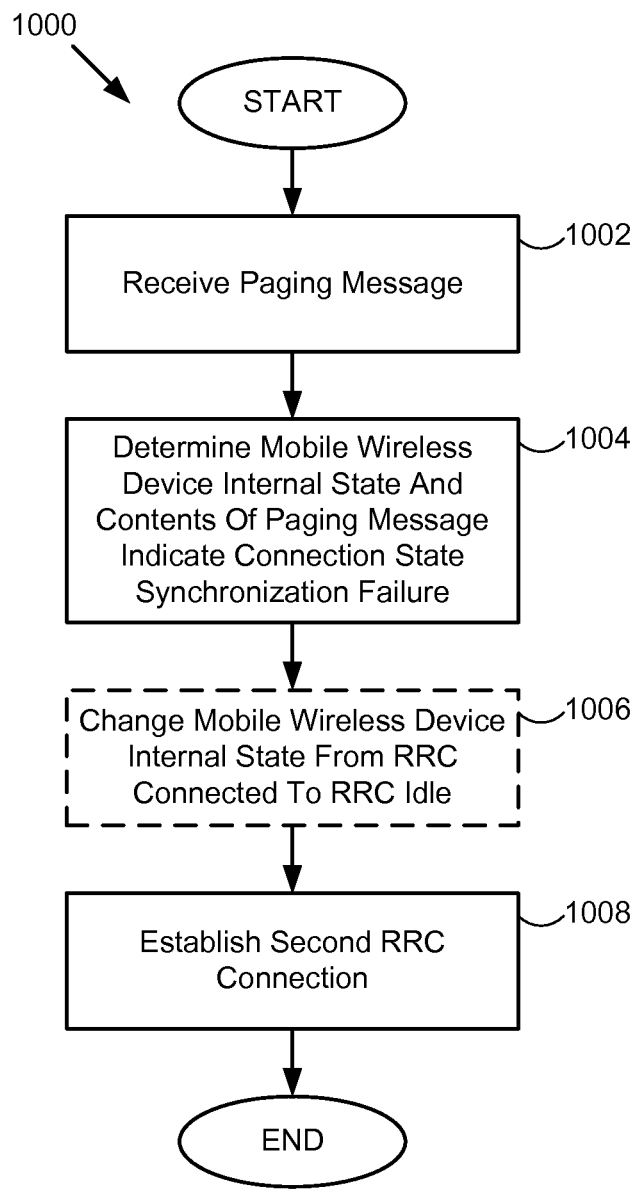
FIG. 10 illustrates a representative embodiment of a method to adjust connections states by a mobile wireless device in communication with a wireless access network.

FIG. 10 illustrates a representative embodiment of a method 1000 to adjust connections states by a mobile wireless device 102 in communication with a wireless access network. In step 1002, the mobile wireless device receives a paging message from the wireless access network. In step 1004, the mobile wireless device 102 can determine that an internal state of the mobile wireless device 102 and at least a portion of contents of the paging message indicate a connection state synchronization failure for a first RRC connection between the mobile wireless device 102 and the wireless access network. In some embodiments, in step 1006, the mobile wireless device 102 changes the internal state of the mobile wireless device from an RRC connected state to an RRC idle state, thereby releasing the first RRC connection. In step 1008, the mobile wireless device 102 can respond to the paging message by establishing a second RRC connection between the mobile wireless device 102 and the wireless access network. In some embodiments, the mobile wireless device 102 can establish the second RRC connection after releasing the first RRC connection.

In a representative embodiment, the mobile wireless device 102 can be connected to a first wireless access network, and both the mobile wireless device 102 and the first wireless access network (or one or more network elements of the wireless access network) can be in an RRC connected state. The mobile wireless device 102 can configure a receiver in the mobile wireless device 102 away from receiving signals from the first wireless access network to listen for signals from (and/or transmit signals to) a second wireless access network. The mobile wireless device 102 can subsequently reconfigure the receiver from the second wireless access network back the first wireless access network. In some embodiments, the time during which the mobile wireless device 102 is configured to receive signals from the second wireless access network can extend beyond pre-determined thresholds for timers for the connection between the mobile wireless device 102 and the first wireless access network. Upon returning to the first wireless access network, the mobile wireless device 102 can be in an RRC connected state, while the first wireless access network can have transitioned to an RRC idle state. The mobile wireless device 102 can detect the misalignment of RRC connected states by examining one or more properties of the paging message received from the first wireless access network.

In a representative embodiment, the mobile wireless device 102 can be connected at the application layer with the first wireless access network, e.g., through an internet connection and/or a particular application, and active data transfer for the application can be interrupted during the time that the receiver is configured to the second wireless access network. The first wireless access network can send data packets to the mobile wireless device 102 during the "tune away" time period and can receive no acknowledgements in response from the mobile wireless device 102. The first wireless access network can attempt retransmissions of the "lost" data packets until one or more timers expire. For a sufficiently long time period, the first wireless access network can drop the lower layer connection to the mobile wireless device 102 (while keeping the higher application layer connection active) and subsequently seek to establish a new lower layer connection to the mobile wireless device 102 in order to continue the high layer application connection. The first wireless access network can send a paging message including a packet switched domain origination (e.g., for the internet application or another higher layer application connection that uses a packet switched data connection). If the mobile wireless device 102 responds to the paging message, the RRC connection can be re-established (or a new RRC connection established) in order to ensure the application layer connection can be retained. If the mobile wireless device 102 does not respond to the paging message, then re-establishment of the RRC connection can be delayed, which can adversely affect performance at the application layer.

In a representative embodiment, the mobile wireless device 102 establishes the second RRC connection with the wireless access network by sending an RRC connection request message to the wireless access network, after releasing the first RRC connection to the wireless access network. The mobile wireless device 102 subsequently receives an RRC connection setup message form the wireless access network, and responds by sending an RRC connection setup complete message to the wireless access network.

In another representative embodiment, the mobile 102 establishes the second RRC connection with the wireless access network by sending an RRC re-establishment request message to the wireless access network (without releasing the first RRC connection to the wireless access network). The mobile wireless device 102 subsequently receives an RRC connection re-establishment message from the wireless access network, and responds by sending an RRC connection re-establishment complete message to the wireless access network.

Figure 11:
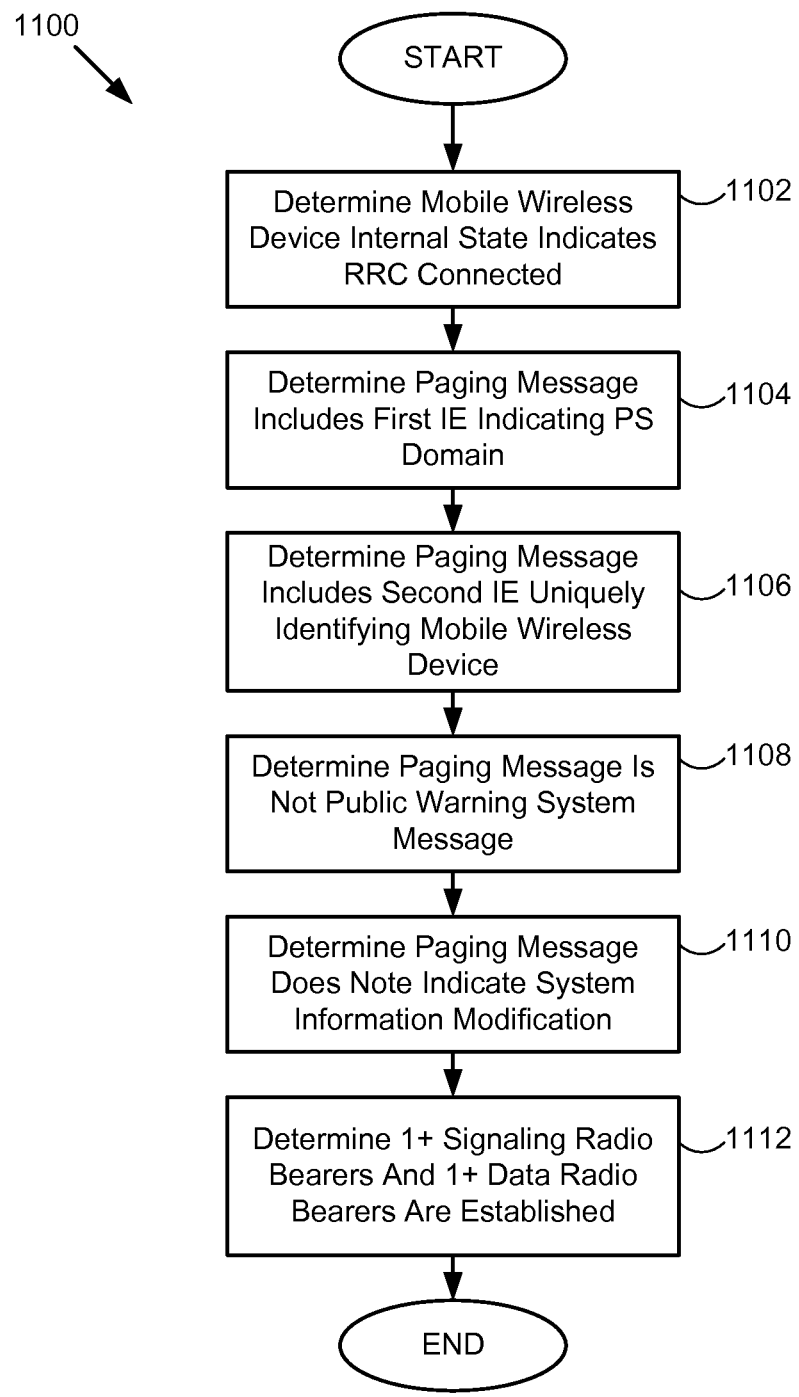
FIG. 11 illustrates representative steps for determining a connection state synchronization failure for an RRC connection between a mobile wireless device and a wireless access network.

FIG. 11 illustrates a set 1100 of representative steps for determining a connection state synchronization failure for an RRC connection between the mobile wireless device 102 and a wireless access network. In a representative embodiment, the mobile wireless device 102 executes some or all of the steps illustrated in FIG. 11 to determine the connection state synchronization failure for step 1004 of the method 1000 illustrated in FIG. 10. In step 1102, the mobile wireless device 102 can determine that an internal state of the mobile wireless device 102 indicates that the mobile wireless device 102 is in an RRC connected state. (If the mobile wireless device 102 is in an RRC idle state, then the mobile wireless device 102 can respond to the received paging message in accordance with an applicable communications protocol used by the wireless access network.) In step 1104, the mobile wireless device 102 examines at least a portion of contents of the received paging message and determines that the paging message includes a first information element (IE) that indicates that the paging message originates from a packet switched domain. In a representative embodiment, the first information element is a core network (CN) domain IE. In step 1106, the mobile wireless device 102, determines that the paging message includes a second information element that uniquely identifies the mobile wireless device 102. In a representative embodiment, the second information element includes a unique identifier for the mobile wireless device 102 and/or a user thereof, e.g., an IMSI, an S-TMSI, an IMEI, or an equivalent unique identifier. In step 1108, the mobile wireless device 102 determines that the paging message is not a public warning system (PWS) message. In a representative embodiment, the paging message is not a commercial mobile alert service (CMAS) message or an earthquake and tsunami warning system (ETWS) message. In step 1110, the mobile wireless device 102 determines that the paging message does not indicate a change to system information. In step 1112, the mobile wireless device 102 determines that at least one signaling radio bearer and at least one data radio bearer is established between the mobile wireless device 102 and the wireless access network. In a representative embodiment, the at least one signaling radio bearer includes an SRB2 type signaling radio bearer.

Figure 12:
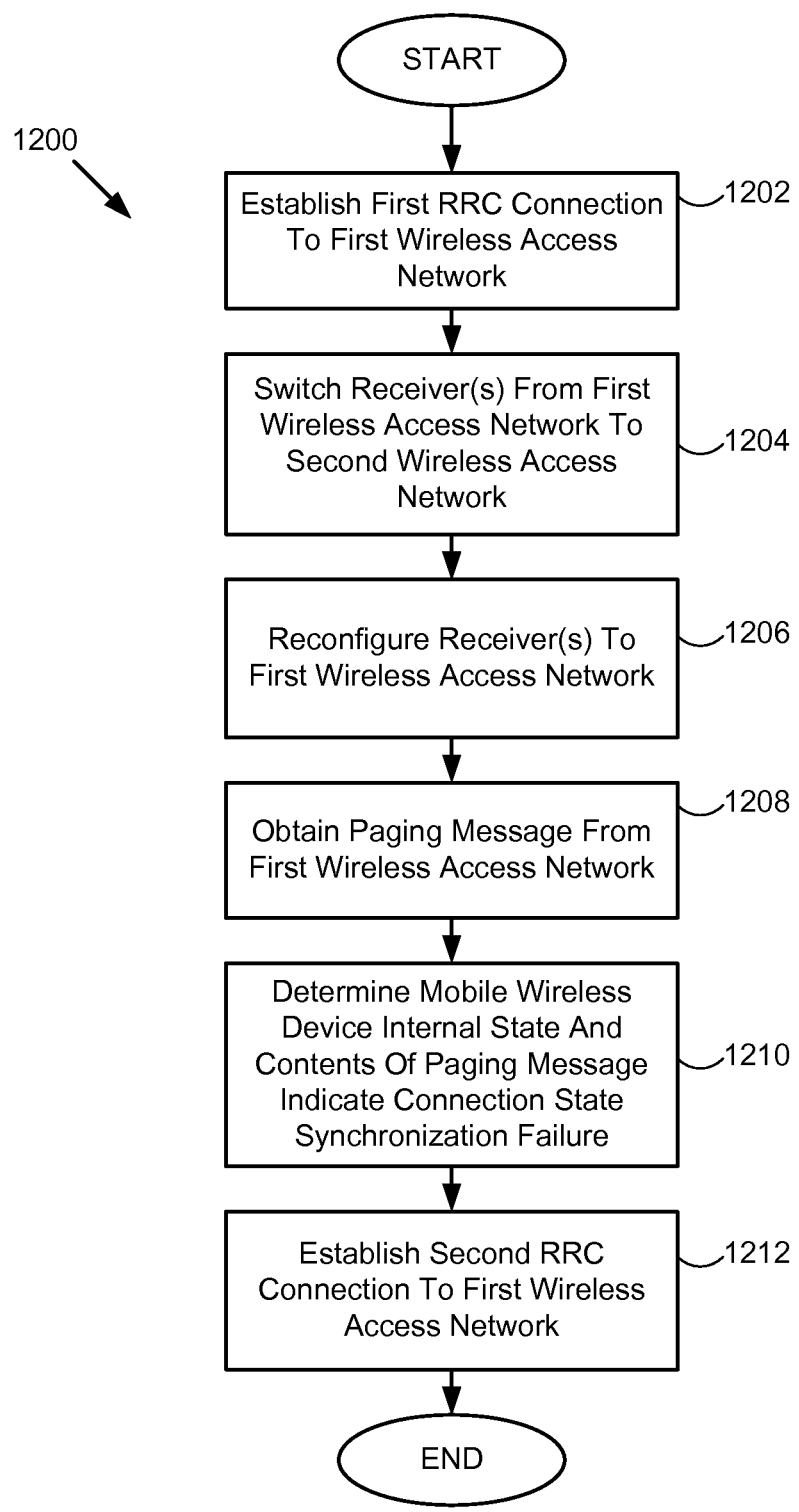
FIG. 12 illustrates another representative embodiment of a method to adjust connections states by a mobile wireless device in communication with a wireless access network following reconfiguration of receivers of the mobile wireless device.

FIG. 12 illustrates another representative embodiment of a method to adjust connections states by the mobile wireless device 102 in communication with a first wireless access network following reconfiguration of receivers of the mobile wireless device from the first wireless access network to a second wireless network and back to the first wireless access network. In step 1202, the mobile wireless device 102 establishes a first RRC connection with the first wireless access network. In a representative embodiment, the first wireless access network is an access network portion of an LTE wireless network 300. In step 1204, the mobile wireless device 102 switches one or more receivers of the mobile wireless device 102 from the first wireless access network to receive signals from a second wireless access network. In a representative embodiment, the second wireless access network is an access network portion of a CDMA 2000 1x wireless network 200. In step 1206, the mobile wireless device 102 reconfigures the one or more receivers from the second wireless access network to receive signals from the first wireless access network. In step 1208, the mobile wireless device 102 obtains a paging message from the first wireless access network. In step 1210, the mobile wireless device 102 determines that an internal state of the mobile wireless device 102 and at least a portion of contents of the paging message indicate a connection state synchronization failure for a first radio resource control (RRC) connection between the mobile wireless device 102 and the first wireless access network. In step 1212, the mobile wireless device 102 establishes a second RRC connection to the first wireless access network. In a representative embodiment, the mobile wireless device 102 changes the internal state of the mobile wireless device 102 from an RRC connected state to an RRC idle state to release the first RRC connection before establishing the second RRC connection to the first wireless access network. In an embodiment, one or more processors of the mobile wireless device 102 are configured to execute the steps of the method 1200 illustrated in FIG. 12. In an embodiment, the mobile wireless device 102 determines that the internal state of the mobile wireless device 102 and at least a portion of contents of the paging message indicate a connection state synchronization failure for a first radio resource control (RRC) connection between the mobile wireless device 102 and the first wireless access network by using one or more method steps illustrated in FIG. 11.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to adjust connections states by a mobile wireless device in communication with a wireless access network, the method comprising:

by the mobile wireless device:
receiving a paging message from the wireless access network;
determining that an internal state of the mobile wireless device and at least a portion of contents of the paging message indicate a connection state synchronization failure for a first radio resource control (RRC) connection between the mobile wireless device and the wireless access network; and
responding to the paging message by establishing a second RRC connection with the wireless access network.

2. The method recited in claim 1, further comprising:
changing the internal state of the mobile wireless device from an RRC connected state to an RRC idle state to release the first RRC connection before establishing the second RRC connection with the wireless access network.

3. The method recited in claim 2, wherein establishing the second RRC connection with the wireless access network comprises:
sending an RRC connection request message to the wireless access network;
receiving an RRC connection setup message from the wireless access network; and
sending an RRC connection setup complete message to the wireless access network.

4. The method recited in claim 1, wherein establishing the second RRC connection with the wireless access network comprises:
sending an RRC re-establishment request message to the wireless access network;
receiving an RRC connection re-establishment message from the wireless access network; and
sending an RRC connection re-establishment complete message to the wireless access network.

5. The method recited in claim 1, wherein determining that an internal state of the mobile wireless device and at least a portion of contents of the paging message indicate a connection state synchronization failure for a first radio resource control (RRC) connection between the mobile wireless device and the wireless access network comprises:
determining that the internal state of the mobile wireless device indicates an RRC connected state;
determining that the paging message includes a first information element indicating that the paging message originates from a packet switched (PS) domain; and
determining that the paging message includes a second information element that uniquely identifies the mobile wireless device.

6. The method recited in claim 5, wherein determining that the internal state of the mobile wireless device and the at least a portion of contents of the paging message indicate a connection state synchronization failure for the first RRC connection between the mobile wireless device and the wireless access network further comprises:

determining that the paging message is not a public warning system message; and determining that the paging message does not include an indication of a change in system information from the wireless access network.

7. The method recited in claim 6, wherein the public warning system message is a commercial mobile alert service (CMAS) message or an earthquake and tsunami warning system (ETWS) message.

8. The method recited in claim 6, wherein determining that the internal state of the mobile wireless device and the at least a portion of contents of the paging message indicate a connection state synchronization failure for the first RRC connection between the mobile wireless device and the wireless access network further comprises:

determining that at least one signaling radio bearer and at least one data radio bearer are established for communication between the mobile wireless device and the wireless access network.

9. The method recited in claim 8, wherein the at least one signaling radio bearer includes an SRB2 type signaling radio bearer.

10. A mobile wireless device comprising:

one or more processors configured to control establishing and releasing connections between the mobile wireless device and a first wireless access network and between the mobile wireless device and a second wireless access network;

a transmitter configured to transmit signals to the first wireless access network according to a first wireless communication protocol and to the second wireless access network according to a second wireless communication protocol; and one or more receivers configured to receive signals from the first and second wireless access networks;

wherein the one or more processors are further configured to:

establish a first RRC connection to the first wireless access network;

switch the one or more receivers from the first wireless access network to receive signals from the second wireless access network;

reconfigure the one or more receivers from the second wireless access network to receive signals from the first wireless access network;

obtain a paging message from the first wireless access network;

determine that an internal state of the mobile wireless device and at least a portion of contents of the paging message indicate a connection state synchronization failure for a first radio resource control (RRC) connection between the mobile wireless device and the first wireless access network; and establish a second RRC connection to the first wireless access network.

11. The mobile wireless device recited in claim 10, wherein the one or more processors are further configured to:

change the internal state of the mobile wireless device from an RRC connected state to an RRC idle state to release the first RRC connection before establishing the second RRC connection to the first wireless access network.

12. The mobile wireless device recited in claim 11, wherein establish the second RRC connection to the first wireless access network comprises:

send an RRC connection request message to the first wireless access network;

receive an RRC connection setup message from the first wireless access network; and send an RRC connection setup complete message to the first wireless access network.

13. The mobile wireless device recited in claim 10, wherein establish the second RRC connection to the first wireless access network comprises:

send an RRC re-establishment request message to the first wireless access network;

receive an RRC connection re-establishment message from the first wireless access network; and send an RRC connection re-establishment complete message to the first wireless access network.

14. The mobile wireless device recited in claim 13, wherein determine that an internal state of the mobile wireless device and at least a portion of contents of the paging message indicate a connection state synchronization failure for a first radio resource control (RRC) connection between the mobile wireless device and the first wireless access network further comprises:

determine that the paging message is not a public warning system message; and determine that the paging message does not include an indication of a change in system information from the first wireless access network.

15. The mobile wireless device recited in claim 14, wherein the public warning system message is a commercial mobile alert service (CMAS) message or an earthquake and tsunami warning system (ETWS) message.

16. The mobile wireless device recited in claim 14, wherein determine that the internal state of the mobile wireless device and the at least a portion of contents of the paging message indicate a connection state synchronization failure for the first RRC connection between the mobile wireless device and the first wireless access network further comprises:

determine that at least one signaling radio bearer and at least one data radio bearer are established for communication between the mobile wireless device and the first wireless access network.

17. The mobile wireless device recited in claim 16, wherein the at least one signaling radio bearer includes an SRB2 type signaling radio bearer.

18. The mobile wireless device recited in claim 10, wherein determine that an internal state of the mobile wireless device and at least a portion of contents of the paging message indicate a connection state synchronization failure for a first radio resource control (RRC) connection between the mobile wireless device and the first wireless access network comprises:

determine that the internal state of the mobile wireless device indicates an RRC connected state;

determine that the paging message includes a first information element indicating that the paging message originates from a packet switched (PS) domain; and determine that the paging message includes a second information element that uniquely identifies the mobile wireless device.

19. A computer program product encoded as computer program code in a non-transitory computer readable medium for adjusting connections states by a mobile wireless device in communication with a wireless access network, the computer program product comprising:

computer program code for receiving a paging message from the wireless access network;

computer program code for determining that an internal state of the mobile wireless device and at least a portion of contents of the paging message indicate a connection state synchronization failure for a first radio resource control (RRC) connection between the mobile wireless device and the wireless access network; and computer program code for responding to the paging message by establishing a second RRC connection with the wireless access network.

20. The computer program product recited in claim 19, further comprising:

computer program code for changing the internal state of the mobile wireless device from an RRC connected state to an RRC idle state to release the first RRC connection before establishing the second RRC connection with the wireless access network.

* * * * *